United States Patent Office 2,901,515
Patented Aug. 25, 1959

2,901,515

2-ALKENYL-3,4-DICHLOROPHENOLS

Raymond H. Rigterink, Midland, Mich., assignor to The Dow Chemical Company, Midland, Mich., a corporation of Delaware No Drawing. Application December 5, 1956
Serial No. 626,297

1 Claim. (Cl. 260—623)

The present invention relates to the 2-alkenyl-3,4-dichlorophenols having the formula

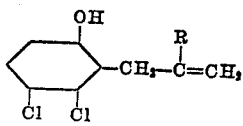

In this and succeeding formulae, R represents hydrogen or methyl. These compounds are colorless liquids somewhat soluble in many organic solvents such as benzene and toluene and of very low solubility in water. They have been found to be active as plant growth control materials and are adapted to be employed in dust and spray compositions for the control of the growth and the killing of weeds and for the sterilization of soil with regard to the growth of plants such as *Raphanus sativus* and *Phalaris canariensis*. The compounds are also useful as parasiticides.

The new compounds may be prepared by heating a 3,4-dichlorophenyl alkenyl ether having the formula

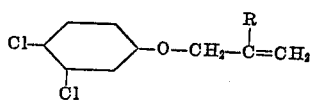

at a temperature of at least 175° C. During the heating, the ether compound rearranges to the desired 2-alkenyl-3,4-dichlorophenol. The reaction may be carried out in the presence of a solvent inert under the conditions of the reaction such as ortho-dichlorobenzene.

In carrying out the reaction, the 3,4-dichlorophenyl alkenyl ether is heated with stirring to at least 175° C. and preferably from 179° to 250° C. for from between about 6 to about 10 hours. Alternatively, the 3,4-dichlorophenyl alkenyl ether may be dispersed in an inert solvent and the resulting mixture heated as previously described. In a convenient method of operation, the solvent mixture is heated at the boiling temperature and under reflux. Upon completion of the reaction, the desired product may be separated by fractional distillation under reduced pressure.

The following examples illustrate the invention but are not to be construed as limiting:

*Example 1.—2-allyl-3,4-dichlorophenol*

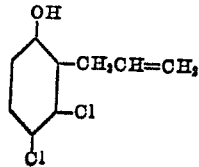

An admixture of 101.5 grams (0.5 mole) of 3,4-dichlorophenyl allyl ether and 150 milliliters of o-dichlorobenzene was heated to the boiling temperature, 179° C., and under reflux for 8 hours. The reaction mixture was thereafter fractionally distilled under reduced pressure to obtain 88 grams of a 2-allyl-3,4-dichlorophenol product boiling at 133°–138° C. at 5 millimeters pressure. The product had a specific gravity of 1.309 at 25°/25° C. and a refractive index $n/D$ of 1.576 at 25° C.

*Example 2.—2-(2-methylallyl)-3,4-dichlorophenol*

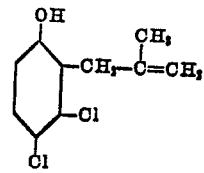

An admixture of 141 grams (0.65 mole) of 3,4-dichlorophenyl methylallyl ether and 212 milliliters of o-dichlorobenzene was heated at the boiling temperature, 179° C., and under reflux for 8 hours. The reaction mixture was thereafter fractionally distilled under reduced pressure to obtain 108 grams of a 2-(2-methylallyl)-3,4-dichlorophenol product. This product had a specific gravity of 1.244 at 33°/25° C. and a refractive index $n/D$ of 1.557 at 29° C.

The new compounds have been tested and found effective as herbicides. For such use the products may be dispersed on an inert finely divided solid and employed as dusts. Also, such mixtures may be dispersed in water with the aid of a wetting agent and the resulting aqueous suspensions employed as sprays. In other procedures, the products may be employed as constituents of oil-in-water emulsions or water dispersions with or without the addition of wetting, dispersing or emulsifying agents. In a representative operation, 100 percent controls of the growth of the seeds and emerging seedlings of radish (*Raphanus sativus*) and canary grass (*Phalaris canariensis*) have been obtained with 2-allyl-3,4-dichlorophenol when distributed in soil at a dosage of 50 pounds per acre.

The 3,4-dichlorophenyl alkenyl ethers employed as starting materials as herein described may be prepared by reacting together substantially equimolecular proportions of 3,4-dichlorophenol, sodium hydroxide and allyl chloride or methallyl chloride in an organic solvent such as ethanol. In such operations, the reactants are mixed together and heated with stirring at the boiling temperature of the reaction mixture and under reflux for from 2 to 6 hours. Following completion of the reaction, the desired ether product may be separated by fractional distillation under reduced pressure.

I claim:

2-allyl-3,4-dichlorophenol.

References Cited in the file of this patent

Hurd et al.: Jour. Amer. Chem. Soc., vol. 58, p. 941 (June 1936).

Tarbell: Chem. Reviews, vol. 27, pp. 504, 505, 509; 544–546 (1940).